United States Patent [19]
Blocker

[11] 3,794,180
[45] Feb. 26, 1974

[54] FLARED CONE FILTER

[76] Inventor: William C. Blocker, 1406 N. Butler Ave., Indianapolis, Ind. 46219

[22] Filed: Jan. 22, 1973

[21] Appl. No.: 325,757

Related U.S. Application Data

[63] Continuation-in-part of Ser. No. 224,012, Feb. 7, 1972, abandoned.

[52] U.S. Cl............................. 210/445, 210/446
[51] Int. Cl............................................ B01d 29/10
[58] Field of Search .... 210/445, 463, 446, 448, 452

[56] References Cited
UNITED STATES PATENTS

| | | | |
|---|---|---|---|
| 3,592,768 | 7/1971 | Parker ............................... | 210/445 |
| 2,019,094 | 10/1935 | Rice et al............................ | 210/445 |
| 2,068,858 | 1/1937 | Jones............................... | 210/445 X |
| 2,068,837 | 1/1937 | Aronson ........................ | 210/445 X |
| 984,082 | 2/1911 | Edgerym......................... | 210/445 X |
| 1,688,401 | 10/1928 | Slagel................................. | 210/445 |

Primary Examiner—Samih N. Zaharna
Assistant Examiner—T. A. Granger
Attorney, Agent, or Firm—Woodard, Weikart, Emhardt & Naughton

[57] ABSTRACT

A screen filter for filtering fluids. A conically-shaped screen is attached to a flare ring. The screen has a filtering surface area approximately ten times the area of the entrance to the screen. The flare ring has a continuous circular side wall which is positioned at an angle with respect to the longitudinal axis of the screen. The ring seats within the flared end of a tube which has a female connector projecting outwardly therefrom to threadingly engage a male connector. The male connector has a beveled inner end which seats within the ring forcing the ring against the flared end of the tube. In the preferred embodiment, the screen extends into the flare ring which is crimped to the screen.

6 Claims, 9 Drawing Figures

FLARED CONE FILTER

CROSS REFERENCE TO RELATED APPLICATION

This application is a continuation-in-part of my U. S. patent application, Ser. No. 224,012, Filed Feb. 7, 1972, entitled FLARED CONE FILTER now abandoned.

BACKGROUND OF THE INVENTION

1. Field of the Invention

This invention is in the field of filters.

2. Description of the Prior Art

A representative sample of the prior art is disclosed in the following U. S. Pat. Nos.: 1,191,741 issued to Scull; 2,242,278 issued to Yonkers; 2,604,958 issued to Leufvenius; 2,910,717 issued to Raymond; and, 3,592,768 issued to Parker.

Various types of fluid systems, such as in liquid petroleum lines or water lines require filtering of the fluid flowing through the system. In systems utilizing fluid regulators, dirt and scale not filtered from the fluid will embed within the seat of the regulator. This prevents the seat from closing off the flow of fluid and as a result, high delivery pressures can mean the loss of fluid, pllot outage and inefficient combustion in the case of gas. Disclosed herein is a new and improved filtering apparatus which provides superior filtering of the fluid. The superior fitering is achieved by having a conically shaped screen having a filtering surface area approximately ten times the area of the fluid entrance of the screen.

A problem with the prior art filters has been the attachment of the screen. Either the screen is attached by welding or other similar means or by special fastening devices all of which either increase the cost or provide a bulky filter. Disclosed herein is a filter which is attached by crimping.

SUMMARY OF THE INVENTION

One embodiment of the present invention is a filtering apparaus comprising a conically-shaped metal screen having a longitudinal axis and an entrance opening, and a flare ring attached to the screen with the axis passing centrally through the ring, the ring having a first continuous circular side wall positioned at an angle not greater than 45 degrees with respect to the axis.

It is an object of the present invention to provide a new and improved filtering apparatus.

Another object of the present invention is to provide a fluid filter for a tube which has a relatively large filtering area as compared to the fluid entrance into the filter.

Related objects and advantages of the present invention will be apparent from the following description.

DESCRIPTION OF THE PREFERRED EMBODIMENTS

Figure 1:
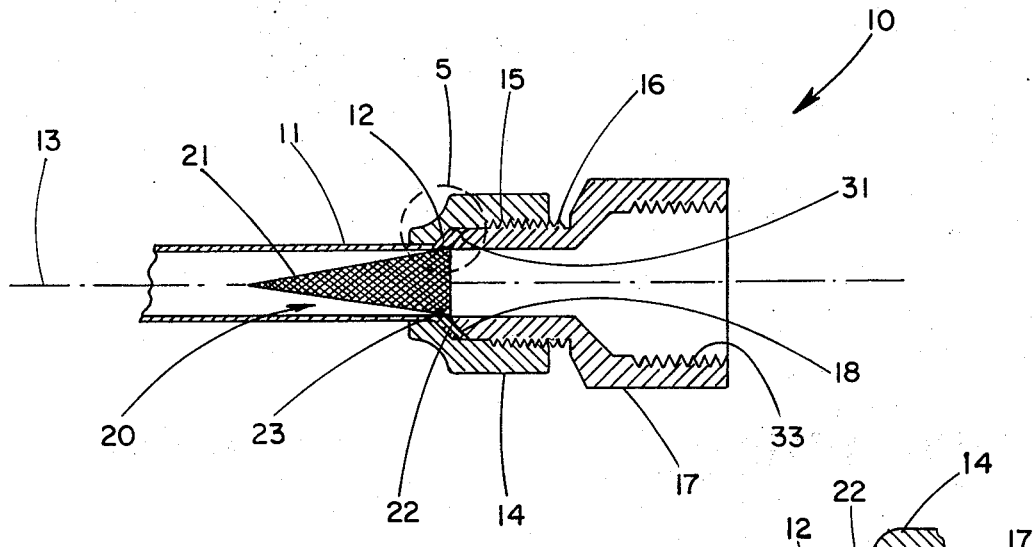
FIG. 1 is a fragmentary cross sectional view of a filtering apparatus incorporating the present invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a filtering apparatus 10 having a tube 11 for carrying fluid. Tube 11 has a flared end 12 which is positioned at an angle of 45° with respect to the longitudinal axis 13 of tube 11. A female connector 14 is mounted to tube 11 and extends outwardly from end 12. Threads 15 of connector 14 are in meshing engagement with threads 16 of male connector 17. The male connector projects into the female connector and has a 45° beveled inner end 18.

A filter 20 is positioned within tube 11 being secured thereto by male connector 17. Filter 20 has a conically shaped screen 21 with a longitudinal axis the same as axis 13. A flare ring 22 is attached to screen 21 at the entrance opening 25 of the screen. Axis 13 passes centrally through ring 22. The ring is attached to screen 21 by any number of standard fastening means 23, such as brazing, soldering, spot welding, or by glue.

Figure 2:
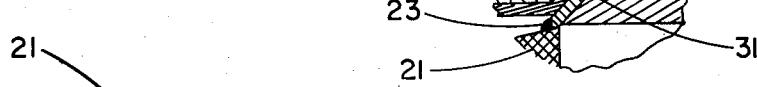
FIG. 2 is an enlarged side view of the filtering screen shown in FIG. 1.
Figure 5:
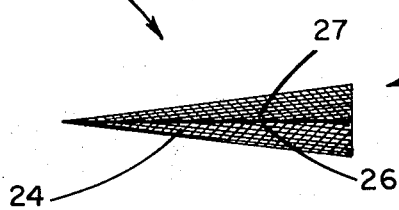
FIG. 5 is an enlarged fragmentary view of the area enclosed by circle 5 of FIG. 1.
Figures 3, 4:
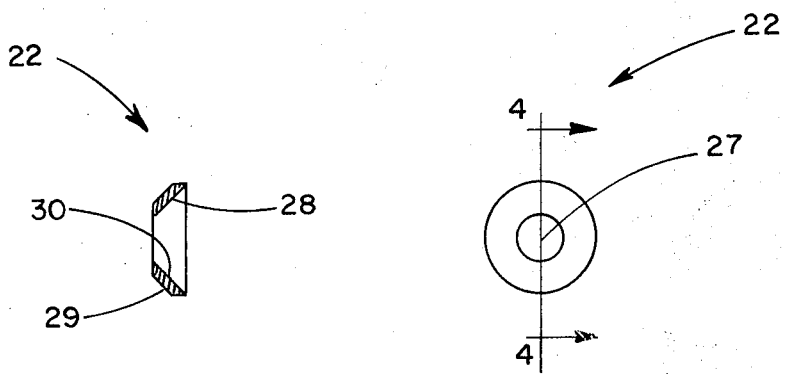
FIG. 3 is an end view of ring 22.
FIG. 4 is a cross sectional view taken along the line 4—4 of FIG. 3 viewed in the direction of the arrows.

Screen 21 is shown in FIG. 2 detached from ring 22 which is shown in FIGS. 3 and 4. Screen 21 has a filtering surface area 24 approximately 10 times the area of the entrance opening 25. Thus, screen 21 is less likely to become plugged with dirt and other foreign matter since the filtering area is much larger than the area which receives the fluid being filtered. Screen 21 is produced by cutting a circular shaped screen from the center thereof to the outer edge forming a pair of edge portions 26 and 27 which extend to the center of the screen. The screen may then be formed into a cone with edges 26 and 27 being secured together by standard fastening means such as solder or the other means previously mentioned to attach the screen to ring 22. Subsequent to the formation of screen 21, ring 22 is attached to the screen immediately adjacent the entrance opening 25. The area of opening 27 of ring 22 is identical with the area of entrance opening 25.

Screen 21 is inserted into tube 11 so that the outer surface of ring 22 seats within flared end 12. Ring 22 has a continuous circular side wall 28 having an outer surface 29 which is positioned at an angle of 45° with respect to axis 13. The inner surface of flared end 12 is positioned at an angle of 45° with respect to axis 13 thereby receiving the outer surface of ring 22. The inner surface 30 of wall 28 is positioned at an approximate angle of 45° with respect to axis 13 as is the outer surface 31 of beveled end 18 of connector 17. Thus, when the ring is seated within flared end 12 and connector 17 is threaded into connector 14, beveled end 18 will seat within ring 22 thereby forcing the ring against the flared end of tube 11. The female threaded end 33 of connector 17 may then be used to secure the filtering apparatus to the incoming fluid line, thereby allowing the fluid to pass through connector 17 and then through the filtering screen 21 and to tube 11.

The filtering apparatus described will allow economical filtering of contaminants, dirt, and moisture from liquid or vapor gas, upstream or downstream of regulators and controls of fluid systems. A variety of materials may be utilized to produce the filtering apparatus. For example, tube 11 may be produced from copper whereas connectors 14 and 17 may be produced from brass. Screen 21 may be stainless steel, and ring 22 may also be produced from brass.

Figure 6:
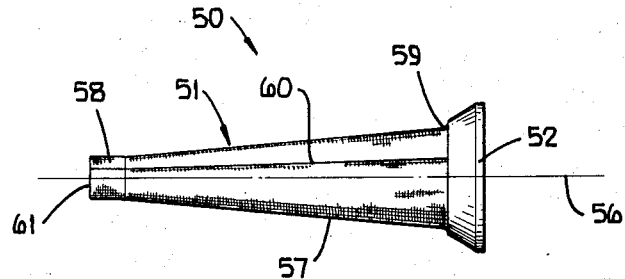
FIG. 6 is a side view of the preferred embodiment of the filter.
Figure 7:
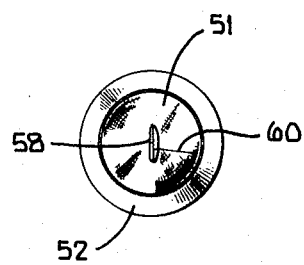
FIG. 7 is an enlarged fragmentary cross sectional view of the filter of FIG. 6 mounted in the connectors 14 and 17 of FIG. 1.
Figure 8:
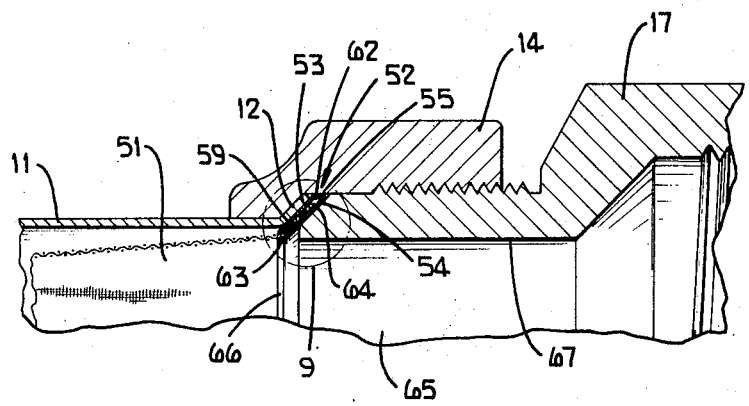
FIG. 8 is an end view of the filter of FIG. 6.
Figure 9:
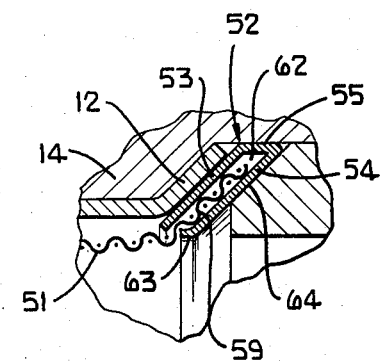
FIG. 9 is an enlarged fragmentary cross sectional view of the screen attached to the flare ring.

The preferred embodiment of the filter is shown in FIG. 6. Filter 50 has a generally conical shape screen 51 secured to flare ring 52. The ring is attached to the screen by crimping. A cross sectional view of ring 52 is shown in FIG. 8. Ring 52 includes an outer wall 53 spaced apart from an inner wall 54. Walls 53 and 54 are integrally connected together by end wall 55 which is parallel to the longitudinal axis 56.

Screen 51 has a conically shaped main body 57 which slopes linearly from flat end 58 to the enlarged flared end 59 extending into ring 52. Main body 57 is circular in cross section with the overlapping edges 60 extending the length of the screen and being joined together by welding or other similar fastening means. Edge 61 of end 58 is sealed to prevent nonfluid objects from passing through the screen. Flared end 59 extends into slot 62 with walls 53 and 54 then crimped together to prevent the disengagement of the screen from the flare ring. The inner circumferential edge 63 of wall 54 is coined inwardly into the screen during the crimping of the ring to the screen. The remaining portion of wall 54 is parallel with wall 53 which in turn is parallel with the flared end 59 of screen 51. When producing filter 50, the screen is first rolled into the cone shaped configuration and then welded along seam 60. A copper strip having a pair of parallel walls integrally joined together at one end is then formed into a circle with the opposite ends joined together so as to form flare ring 52. End 59 of screen 51 is then flared and inserted into slot 62. Walls 53 and 54 are then forced together so as to crimp the ring onto the screen. A variety of different types of materials may be utilized to produce screen 51; however, best results have been obtained by using a stainless steel screen having an approximate mesh of 200 mesh per square inch.

Filter 50 is shown mounted in connectors 14 and 17 (FIG. 8) which have already been described for receiving filter 20 shown mounted in connectors 14 and 17 in FIG. 1. Walls 53 and 54 are parallel with and positioned between flared end 12 of tube 11 and surface 64 of beveled end 65 of male connector 17. As previously described, female connector 14 is mounted to tube 11 and extends outwardly from end 12 being threadedly connected to male connector 17. Walls 53 and 54 are positioned at an angle of 45° with respect to the longitudinal axis 56. Axis 56 passes centrally through ring 52. The filtering surface area of screen 51 is approximately 10 times the area of the hole formed by the inner circumferential edge 63 of the flare ring. The inner surface 66 of circumferential edge 63 is coaxially aligned with and parallel with the inner surface 67 of male connector 17. Thus, the flare ring does not impede the flow of fluid through the hole extending through male connector 17.

The preferred embodiment of the filter is particularly advantageous in that the beveled end of male connector 17 forces wall 53 and 54 together when the male connector is threaded into the female connector 14. As a result, the screen is firmly secured to the flare ring without requiring a special fastening step during the production of the filter such as welding or brazing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example, the side wall of the flared ring 22 may be positioned at an angle not greater than 45° with respect to axis 13. In one embodiment this angle was 37°.

The invention claimed is:

1. A filtering apparatus comprising:
    a conically-shaped metal screen having a longitudinal axis and an entrance opening;
    a flare ring attached to said screen with said axis passing centrally through said ring, said ring having a first continuous circular side wall positioned at an angle not greater than 45° with respect to said axis;

said flare ring including a second continuous side wall integrally joined to but spaced apart from said first side wall forming a continuous slot receiving said metal screen with said first side wall and said second side wall forced together crimping said ring to said screen.

2. The filtering apparatus of claim 1 wherein:
    said screen includes a flared end portion at said entrance opening which projects into said slot.

3. The filtering apparatus of claim 2 wherein:
    said screen has a conically-shaped main body with said flared end portion projecting outwardly therefrom.

4. The filtering apparatus of claim 3 and further comprising:
    a tube for carrying fluid having a 45 degree outwardly flared end whereby said ring may seat thereon with said screen projecting into said tube;

a female connector mounted to said flared end and extending outwardly therefrom; and,
    a male connector projecting into said female connector and having a beveled inner end extending into said ring and forcing said ring against said flared end of said tube and forcing said first side wall against said second side wall.

5. The filtering apparatus of claim 4 wherein:
    said flare ring has a circular inner circumferential edge attached to said second side wall which projects therefrom into said conically shaped main body.

6. The filtering apparatus of claim 5 wherein:
    said screen has a tip end and an opposite enlarged end with said opening located at said enlarged end and wherein fluid flow through said tube is in a direction from said tip end toward said enlarged end, said flare ring projects away from said entrance opening in a direction from said tip and toward said enlarged end, said male connector including a hole defining an inner surface parallel to and coaxially aligned with said inner circumferential edge of said flare ring.

* * * * *